(12) United States Patent
Klein et al.

(10) Patent No.: US 8,878,852 B1
(45) Date of Patent: Nov. 4, 2014

(54) INTEGRATED INFRASTRUCTURE GRAPHS

(75) Inventors: Matthew D. Klein, Seattle, WA (US); Michael David Marr, Monroe, WA (US)

(73) Assignee: Amazon Technologies, Inc., Seattle, WA (US)

( * ) Notice: Subject to any disclaimer, the term of this patent is extended or adjusted under 35 U.S.C. 154(b) by 314 days.

(21) Appl. No.: 13/535,959

(22) Filed: Jun. 28, 2012

(51) Int. Cl.
G06T 11/20 (2006.01)

(52) U.S. Cl.
USPC .......................................................... 345/440

(58) Field of Classification Search
USPC .......................................................... 345/440
See application file for complete search history.

(56) References Cited

U.S. PATENT DOCUMENTS

| | | | |
|---|---|---|---|
| 7,143,392 B2 * | 11/2006 | Ii et al. ........................... | 717/125 |
| 7,958,089 B2 * | 6/2011 | Rankov et al. ................ | 707/620 |
| 8,166,008 B2 * | 4/2012 | Rankov et al. ................ | 707/703 |
| 2010/0169137 A1 * | 7/2010 | Jastrebski et al. ................ | 705/7 |

\* cited by examiner

Primary Examiner — M Good Johnson
(74) Attorney, Agent, or Firm — Knobbe, Martens, Olson & Bear, LLP (57) ABSTRACT

Various features are described for generating and analyzing data center topology graphs. The graphs can represent physical placement and connectivity of data center components. In some cases the graphs may include hierarchical representations of data center components and systems, and may also include environmental and operational characteristics of the computing devices and supporting systems which may be included in a data center. In addition, the graphs may be linked to each other though common components, so that data center topology may be analyzed in two or more dimensions rather than a single dimension. The linked graphs may be analyzed to identify potential points of failure and also to identify which data center components may be affected by a failure.

30 Claims, 9 Drawing Sheets

INTEGRATED INFRASTRUCTURE GRAPHS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public. Additionally, the computing systems may be connected to power and network components, and may be located in rooms which are under the control of an environmental control system. Faults in any of the supporting systems may interrupt or otherwise affect the operation of the computing systems, and faults in computing systems may affect each other.

Customers often expect the computing resources provided by data centers to be available without interruption for a large percentage of time. For example, it is a common expectation that a data center's computing resources will be available for 99.9% of the time or greater. Factors which may interrupt or impact performance, cause faults, and otherwise contribute to downtime include the physical location and physical connectivity of computing systems such as servers, network components such as switches and routers, and other data center components. For example, a physical server device experiencing an explosion or fire may affect a number of other physical computing devices within a geographic proximity of the device. Additional factors include various environmental and operational characteristics of the data center components and the data center as a whole. Maps and graphs of physical layouts and network topologies may be used to plan, install, and troubleshoot data center components. The topological representations may be based on engineering plans and other schematics.

BRIEF DESCRIPTION OF THE DRAWINGS

Embodiments of various inventive features will now be described with reference to the following drawings. Throughout the drawings, reference numbers may be reused to indicate correspondence between referenced elements. The drawings are provided to illustrate example embodiments described herein and are not intended to limit the scope of the disclosure.

DETAILED DESCRIPTION

Generally described, the present disclosure relates to the management of computing device resources. Specifically, one aspect of the present disclosure relates to generating graphs of data center component and system topologies. The graphs are not limited to physical placement and logical connectivity, but in some cases may include hierarchical representations of data center components and systems. Additionally, the graphs may also include environmental and operational characteristics of the computing devices and supporting systems which may be included in a data center or regional location. For example, one graph may correspond to physical layout of at least a portion of a data center, organized by physical proximity of computing devices and structural aspects of a facility. Another graph may correspond to layout of at least a portion of a data center organized according connections between computing devices. Yet another graph may correspond to a thermal representation of at least a portion of a data room organized by thermal zones.

Illustratively, multiple graphs may be linked based on common components or attributes so that data center topology may be analyzed in two or more dimensions rather than a single dimension. For example, the graph representing a physical layout of a data center room, such as a blueprint, may be linked to the thermal graph of the temperature zones within the room, such as a heat map. Additionally, the connectivity graph of the network connections between the data center components within the room and the rest of the data center may also be linked to thermal graph and physical layout graph. Further aspects of the disclosure relate to the generation and analysis of linked graphs. The analysis may identify likely points of failure in the systems and setup of a data center in various operational scenarios. Systems and components which are common to any set of data center components may be identified and analyzed to determine whether a failure may affect multiple otherwise independent data center components.

In addition to the physical aspects of computing infrastructure, devices may also be organized into logical hierarchies and connected with physical cabling, wireless signaling or otherwise purely programmatic abstractions (e.g., API calls). These "logical topologies" apply to such things as network layout of hosts within a network switching fabric, power connections made through data center, room and rack level power distribution components, or execution dependencies between software components. Components may fail in the physical domain and interrupt correct functioning of devices that are not necessarily in close physical proximity because of the "logical" connections; for example, a failed network router may cause service interruptions to servers even in entirely different geographic regions. Additional factors include various environmental and operational characteristics of the data center components and the data center as a whole. Maps and graphs of both physical layouts and logical connectivity of servers, networking components, power distribution components or software components may be used to plan, install, and troubleshoot data center components.

Although aspects of the embodiments described in the disclosure will focus, for the purpose of illustration, on relationships and interactions between data center components, one skilled in the art will appreciate that the techniques disclosed herein may be applied to any number of hardware or software processes or applications. Further, although various aspects of the disclosure will be described with regard to illustrative examples and embodiments, one skilled in the art will appreciate that the disclosed embodiments and examples should not be construed as limiting. Various aspects of the disclosure will now be described with regard to certain examples and embodiments, which are intended to illustrate but not limit the disclosure.

With reference to an illustrative embodiment, a graph representing the physical layout of a data center may be generated. The graph may be based on a blueprint, computer generated designs, models, drawings, or other design layout. In one embodiment, a data center may be subdivided into a number of physical rooms, physical partitions (e.g., full or partial walls), and the like. A number of physical computing devices may reside in each room, often organized into structures that increase the number of devices that may physically fit in a space, often referred to as a server rack or rack. Additionally, the data center can include a number of supporting systems for the computing devices, such as power, networking, and environmental control. The location of each physical data center component, including servers, air conditioning units, power distribution units, and the like may be noted on the graph representing the physical layout. In some embodiments, the various cables and other physical connection components may also be noted on the physical layout graph.

A second graph representing the connectivity between the various system components may be generated. In some embodiments, the graph may be a tree or some other directed graph representing the connections between components and the direction of each connection, such as a two-way network communication connection, one-way power distribution connection, etc. A third graph representing the temperature of each component or of various locations within the data center may be generated based on temperature observations, thermisters, and the like. A fourth graph representing the physical radius of impact of each data center component may be generated (sometimes known in the art as "blast radius"), representing the area that would likely be affected by a severe physical failure, such as a fire or flood or explosion, were to occur. "Blast radius" may also refer to logical dimensions of impact as well, such as the "blast radius of a router failure" on network flows traversing the router even though the server endpoints communicating over the network may not be in close physical proximity to the router. Any number of additional graphs may be generated to represent the various characteristics of data center topology and factors which may impact the data center components or software systems operating on those components.

In some embodiments, the graphs may be linked so that the data center topology may be analyzed with respect to two or more related dimensions or characteristics concurrently, rather than as a set of discrete characteristics. For example, the effects of one characteristic, such as temperature or blast radius, may be analyzed with respect to their effect other data center characteristics, such as physical layout and network connectivity. Two or more graphs may be linked by data center components or characteristics present in each of the graphs, such as a computing device included in both the physical layout graph and the network connectivity graph, or a physical location included in both the physical layout graph and the temperature graph.

Figure 1A:
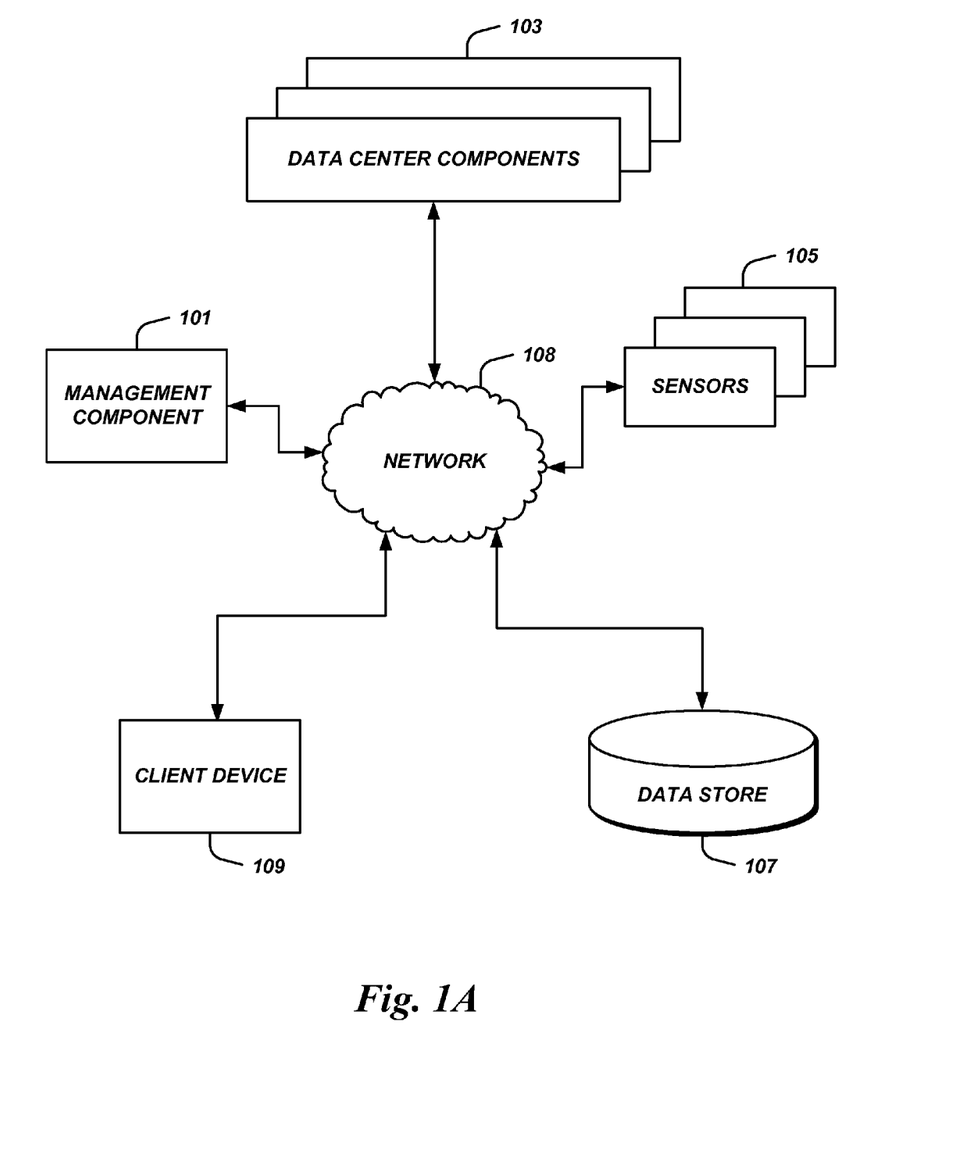
FIG. 1A is a block diagram of an illustrative data center environment including a management component configured to collect data, generate linked graphs, and respond to queries from a client device.

Prior to describing data center component topologies and processes for creating, linking, and analyzing topology maps in detail, an example data center environment in which these features can be implemented will be described. FIG. 1A illustrates a network computing environment including a management component 101, multiple data center components 103, sensors 105, a data store 107, and a client device 109. The various components may communicate via a network 108. In some embodiments, the network computing environment may include additional or fewer components than those illustrated in FIG. 1A. For example, the number of data center components 103 may vary substantially, there may be no sensors 105, etc.

The management component 101 can receive data from a number of sources, correct errors and reconcile data from one source to that of another, generate and link graphs, and respond to queries from the client device 109. For example, the management component 101 may receive data regarding the data center components 103 and operational characteristics thereof directly from the data center components 103, from sensors 105, from a data store 107, from data entry or manual scanning of barcodes associated with the various data center components, or from some other source. As described in detail below, the data may indicate the location, network connectivity, power system connectivity, temperature, and the like with respect to the various data center components 103. The management component 101 can reconcile the data received from disparate sources (e.g.: temperature data from a sensor integrated with a data center component 103 against data from an independent sensor 105 nearby), and generate linked graphs representing various characteristics of the data center components 103. In some embodiments, the management component 101 can generate an alert upon detection of a discrepancy in the data.

The management component 101 and/or the client device 109 may be computing devices, such as server computers or desktop computers, configured with various hardware and software modules to implement the processes described herein. In addition, the management component 101 and/or the client device 109 may be physically located within a data center, and may therefore also be a data center component 103. In some embodiments, the management component 101 or client device 109 may be remote from the data center which includes the data center components 103. In some embodiments, the management component 101 may be integrated with the client device 109 or physically co-located on the same computing device.

A user, such as a data center administrator or a technician, may use the client device 109 to query and view linked graphs created by the management component 101. For example, a technician may wish to trouble shoot a technical issue experienced by a specific data center component 103, such as a network switch. The technician can query the graphs for a listing of all data center components 103 associated with the network switch to determine a logical "blast radius" of data center components 103 which may be affected by a failure of the network switch. The logical blast radius need not correspond to any physical geographical area, but rather can include data center components 103, in communication with the network switch, which may be affected by a failure of the network switch regardless of physical location. The technician may also query and view a graph, optionally linked to the previously described graph, which indicates which data center components 103 may be within a physical blast radius of the network switch. The physical blast radius may correspond directly to geographic proximity, such that those data center components 103 closest to the network switch will be affected by severe physical conditions which impact the functioning of the network switch, such as a fire, flood, and the like.

Figure 1B:
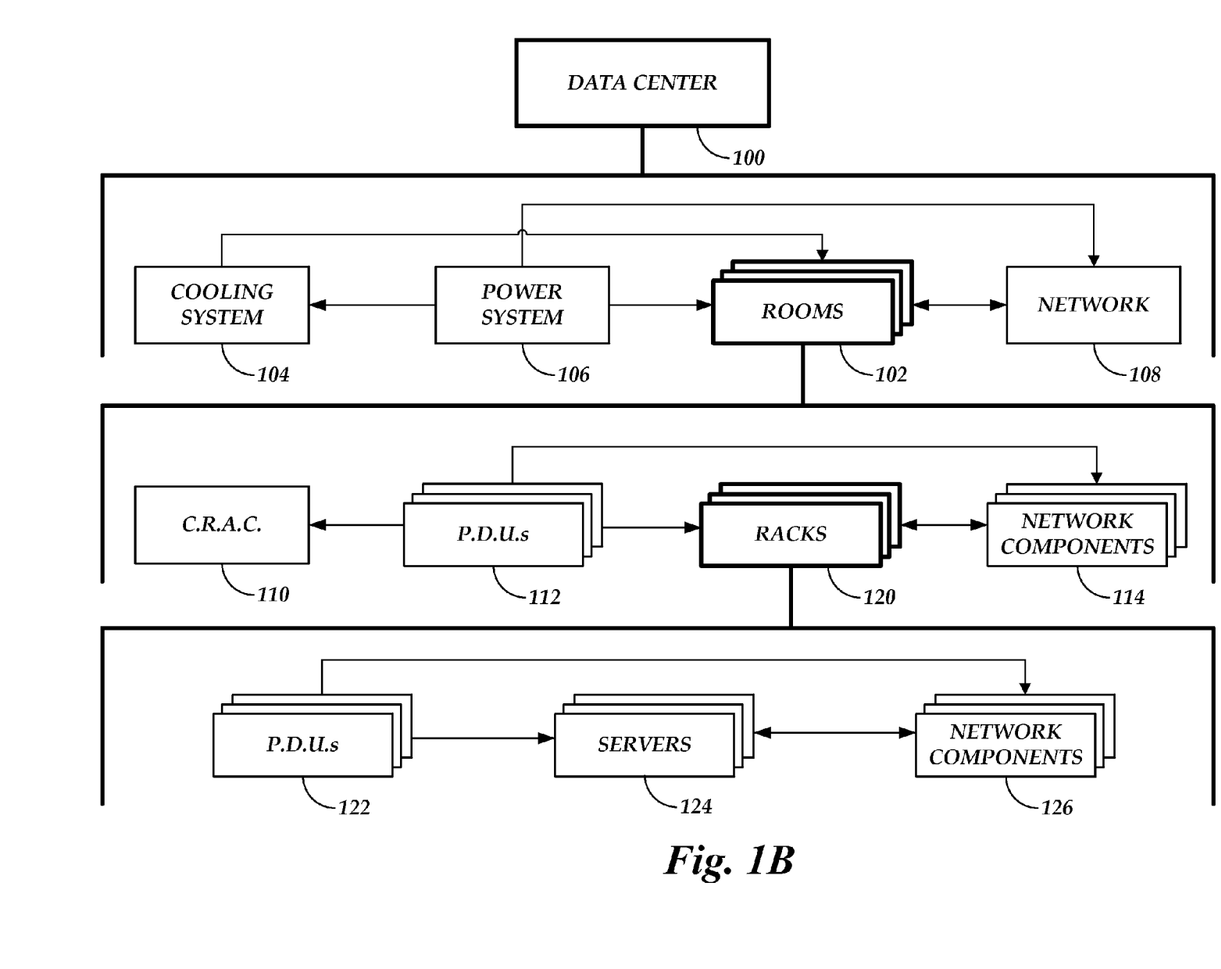
FIG. 1B is a block diagram of an illustrative data center hierarchy including components that may be included in various rooms, and also components that may be included in various racks.

FIG. 1B illustrates an example hierarchy of data center components 103 that may be monitored by the management component 101 of FIG. 1A, or some other component, in order to generate and link graphs of data center component 103 characteristics. The various data center components 103 may be included in a data center 100 implementation to provide computing capacity, storage, and other services to any number of customers or internal users. In some embodiments the data center 100, or any hierarchical level thereof, may have more or fewer components than are illustrated in FIG. 1B.

A data center 100 may be part of a larger computing system operated by a network computing provider that includes several data centers 100 across any number of geographical areas. The various data centers 100 may communicate via a network. The network may be a wide area network (WAN), a collection of networks operated by distinct entities, such as the Internet, or some other network. The network computing provider can provide computing and storage capacity to a single operator, such as a single enterprise, such as a company or university. The computing services may include web hosting, data backup and mirroring, disaster prevention co-locations, and the like. In another embodiment, the network computing provider provides such computing services and storage capacity to a variety of independent customers, such as a number of different business entities. In yet another embodiment, the network computing provider can provide computing services and storage capacity to users in the general public.

Customers may access the services on-demand or on a subscription basis. In some embodiments, the customers of the network computing provider may specify or select a particular computing device hardware and software configuration to use. Customers may then connect to a different physical computing device which satisfies the chosen hardware configuration each time the customer initiates a computing session. Virtual machine images of the chosen software configuration may be dynamically loaded or instantiated on a computing device as part of a computing session initialization process. In some embodiments, the software may not be a virtual machine image, and the computing device need not be a different computing device for each computing session.

As illustrated in FIG. 1B, a data center 100 may include any number of rooms 102 in which computing devices and other data center components 103 that provide the services described above, or which support components which provide the services, are physically located. The data center 100 may also include a cooling system 104, a power system 106, and a network 108. For example, a data center 100 typically has a power system 106 that connects to a power source, such as the local power grid. The power system 106 may include a power generator for backup or as a primary power source. The power system 106 provides power to the various data center components 103, including the cooling system 104, network 108, and also the rooms 102.

The various components 103 of the data center 100 may emit heat that can be harmful to the function of the components themselves and to other components nearby. Therefore, the data center 100 may include a cooling system 104, such as an air conditioner, that regulates the temperate of the data center 100 and its various rooms 102 and components. In some embodiments, a more powerful or more efficient cooling system 104 may be provided instead of, or in addition to, an air conditioner. For example, some data centers 100 may include a cooling loop that circulates chilled water throughout the data center 100 and various rooms 102 thereof, and a condenser or evaporative waterfall to cool the water after it has absorbed heat from the data center 100 components.

The data center components 103 associated with the data center 100 may also communicate with each other and with components outside of the data center 100 via a network 108. The network 108 can be provided by a number of components, such as routers, switches, hubs, and the like. The network 108 components may communicate via cables or wirelessly. The network 108 can provide connectivity between the various rooms 102 of the data center 100 and to one or more network links outside of the data center 100, for example to the Internet or a WAN. In some embodiments, there may be several core switches and/or routers with which the network components of the various rooms 102 communicate to provide redundancy and fault tolerance.

A room 102 of the data center 100 illustrated in FIG. 1B can encapsulate a number of data center components 103 and further hierarchical levels. For example, a room 102 may include any number of racks 120 of computing devices, a cooling system 104 component such as a computer room air conditioning (CRAC) unit 110, any number of power system 106 components such as power distribution units (PDUs) 106, and any number of network components 114 in communication with the network 108 of the data center 100.

The PDUs 112 may include one or more room-level PDUs 112 which each serve to power several racks 120. In such cases the room-level PDUs 112 may connect to rack-level PDUs 122 via cables and power whips. The rack-level PDUs 112 can then distribute power to the devices of the rack 120 as described below. In addition, the room-level PDUs 112 can provide power to the CRAC unit 110 and the network components 114.

The network components 114 include room-level switches and/or routers which facilitate communication between the computing devices housed in the racks 120, described below, and the network 108 of the data center 100. For example, a room-level switch 114 may facilitate communication between computing devices on separate 120 racks within the same room. Additionally, the room-level switch 114 may, in combination with the core routers of the data center 100, facilitate communication between computing devices in different rooms 102, or even different data centers 100 and other computing devices outside the network computing provider environment.

A rack 120 may be any frame or enclosure capable of mounting one or more servers or other computing devices. For example, the rack 120 can be a four-post server rack, a server cabinet, an open-frame two-post rack, a portable rack, a LAN rack, combinations of the same, or the like. In some embodiments, the computing devices mounted on the rack 120 may be networking components 126, such as switches or routers, instead of or in addition to servers. For example, a data center room 102 may have, in addition to racks 120 which contain servers 124, one or more racks 120 which may contain any number of switches. In some embodiments, a data center room 102 may contain only one rack 120, or may contain zero racks 120. For example, a data center room 102 may have servers 124 embodied as one or more large-scale computing devices, such as mainframes or midrange computers, which may not be grouped together physically in a rack 120.

A rack 120 may also encapsulate a number of data center components 103 and additional hierarchical levels, such as PDUs 122, servers 124, and network components 126. For example, a rack 120 may include any number of PDUs 122 and other data center components 103, such as power whips and the like, for providing power from the room-level PDUs 112 to the servers 124 and network components 126 mounted in or associated with the rack 120. The network components 126 of the rack 120 can include top-of-rack (TOR) switches which provide network connectivity between the room-level network components 114 and the servers 124. The network components 126 can also be powered by the rack-level PDUs 122.

Each server 124 can comprise additional data center components 103, each of which may be monitored, such as a processing unit, a network interface, computer readable medium drive, and a memory. The memory generally includes RAM, ROM and/or other persistent or non-transitory memory, and may contain a hypervisor for managing the operation and lifetime of one or more virtual machine (VM) instances. In some embodiments, the VM instances are also data center components 103 which may be included in the graphs generated by the management component 101 of FIG. 1A. In other embodiments, application software or services operating on other data center components may be included in the graphs.

As described above, servers 124 can be configured to host VMs at the request of customers of the network computing provider operating the data center 100. For example, a business entity may rent computing and storage capacity from the network computing provider, and may choose a VM configuration or have a VM machine image customized for their needs. A single server 124 may at any time have one, two, or (possibly many) more VMs operating on behalf of customers, actively processing data, responding the customer requests, and the like. In some embodiments, the server 124 need not host VMs, and therefore the server 124 may not have a hypervisor or VMs in memory.

In operation, a customer may initiate processing on a server of the data center 100 by transmitting network communications via the Internet to the data center 100. The communications can be routed through the network 108 of the data center 100, passing through a core switch and to a room-level network component 114, such as a switch, of a particular room 102. From there, the communications are passed to a rack 120, where they pass through a rack-level network component 126, such as a TOR switch, before ultimately arriving at a server 124. The server 124 may be a fixed host which performs internal processing, such as routing the communication to another server 124 where a VM for the customer will be launched to process the communication and provide the customer computing session. As will be appreciated, such an operation can involve additional communications sent over multiple rack-level network components 126, room-level network components 114, and components of the network 108 of the data center 100 before arriving at a server 124 that will launch a VM for the customer in a different room 102 of the data center 100.

The server 124 which launches the VM for the customer may receive power, through a power cable, from a rack-level PDU 122 of the rack 120 on which the server 124 is located. The rack-level PDU 122 may in turn receive power through one or more "power whips" or cables from a room-level PDU 112. The power may pass through any number of PDUs in between the rack-level PDU 122 and room-level PDU 112. The room-level PDU 112 can draw power from the power system 106 of the data center 100. The power may come from another PDU or directly from an on-site generator or power source, or from a link to the local power grid outside of the data center 100.

Each data center component 103 involved in the illustrative communication described above can generate heat as the data center component 103 transfers power or communications, or performs other computing operations. Heat can cause damage to the data center component 103 which generates the heat, and also to nearby components, such as wiring, servers 124, network components 126, 114, PDUs 122, 112, etc. In order to dissipate the heat, a room-level component of the data center cooling system 104 may be used, such as a CRAC 110. In some embodiments, rack-level cooling units may also be implemented, including fans, pipes carrying chilled water, and the like. Either rack-level or room-level cooling components and systems may be connected to a data center cooling system 104, such as a chiller loop. As will be appreciated, the cooling components of the data center 100 may also be coupled to the power system 106 of the data center 100, as described above with respect the servers 124 (i.e., fans, compressors and pumps typically require electrical power to operate).

Figure 2:
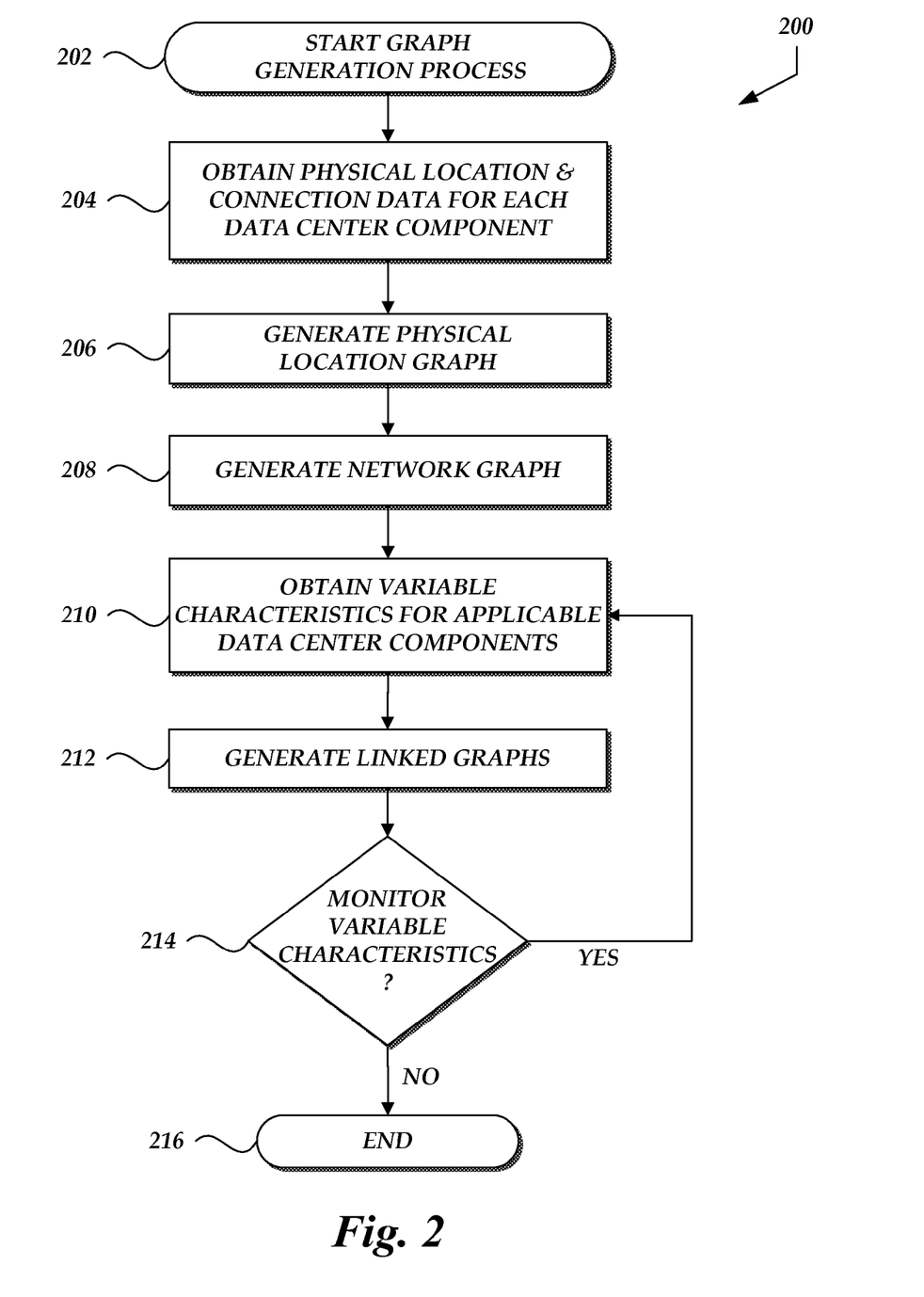
FIG. 2 is a flow diagram of an illustrative process for generating maps of the data center components.

Turning now to FIG. 2, an illustrative process 200 for organizing data regarding the physical and logical components of the data center 100 hierarchy will be described. Maps and graphs of data center 100 component topologies can be created to aid in determining which components are located in particular areas of the data center 100, which components are in communication with each other, which environmental and operational characteristics associated with certain components may affect other components in different physical locations, etc. To facilitate such determinations, each data center component may be assigned a unique identifier, and components which communicate with or connect to each other can be associated with each other through data records that include the unique identifiers. Physical locations within the data center 100 may also be assigned unique identifiers, and components at the physical locations can be associated with the physical locations through the creation and maintenance of data records including unique identifiers for the component and the physical location.

Environmental and operational characteristics which may be tracked and incorporated into the maps and graphs described below include: the temperature of data center components and nearby areas; a blast radius associated with a data center component, and which components are physically located within the blast radius or are in communication with a component within the blast radius; which components are hosting customer VMs or are supporting components which are hosting customer VMs; and which VMs are associated with each customer. Information about such environmental and operational characteristics may be useful in data center 100 troubleshooting and maintenance. For example, the information can provide administrators and technicians with information beyond which physical components are located where, but also which risk factors are associated with the physical components, and how failures of the components may affect other components, both nearby and in different physical locations within the data center 100 based on logical dependencies.

The process 200 of collecting data and generating topology maps and graphs begins at block 202. The process 200 may be initiated on-demand, or it may be executed according to a regular or irregular schedule. The process 200 may be executed by a computing system within our outside of the data center 100. For example, the process 200 may be embodied in a set of executable program instructions and stored on a computer-readable medium drive associated with a computing system. When the process 200 is initiated, the executable program instructions can be loaded into memory, such as RAM, and executed by one or more processors of the computing system. In some embodiments, the computing system may encompass multiple computing devices, such as servers, and the process 200 may be executed by multiple servers, serially or in parallel.

At block 204, the computing system executing the process 200 can obtain data regarding the physical location of each component in the data center 100, or some subset thereof. Additionally, data regarding the connections associated with each component may be obtained. In some embodiments, each component of the data center 100 may have a barcode affixed to or otherwise associated the component, and the barcode may include the unique identifier assigned to the component. Data center 100 personnel may periodically, or upon installation only, scan the barcode of each component to associate the component with a physical location within the data center 100. The physical locations may also have barcodes which include the unique identifier associated with the location. A barcode of a server 124 may be scanned along with a barcode of a particular position within a rack 120. The rack 120 barcode may be scanned as being stored in particular room 102, and so on. The cables which connect servers 124 with network components 126, and which connect network components 126 with other network components 126, 114 may also be scanned with the components with which they are coupled. Therefore, not only the physical location of components may be tracked by the data records generated during the scanning process, but also which components are directly connected to each other. It will be appreciated that a similar technique may be used to scan power whips and other power links, and the corresponding connections between PDUs 112 and servers 124, network components 114, other PDUs 112, etc. Note that the graphs may contain both "connectivity" information, such as which components are connected by a cable, or "containment" or location information such as which components are inside other components, such as a rack inside a room. Like "connectivity", "containment" may also be a logical concept such as the server IP addresses within a subnet. Container components may contain other containers, such as racks (which contain servers) inside rooms (which contain racks and other equipment), or logical IP address subnets inside bigger IP address subnets.

As described above, data regarding locations, containment, connections, and the like may be obtained from any number of sources. As a result, there may be redundant sources of the same type of data. For example, network topology data may be received from network components 114 (e.g.: Open-Shortest-Path-First (OSPF) data) and also from end-host inspection (e.g.: trace route). In another example, data regarding the physical rack position of a server 124 may be obtained from a database of intended positions and also from data center personal that manually scan barcodes for servers 124 and their physical rack position. When obtaining redundant data, conflicts and other discrepancies may be discovered (e.g.: a specific server 124 is associated with a different physical rack position depending on the source of the physical location data). When such a discrepancy is discovered, the computing system executing the process 300 may be configured to initiate an automatic remediation workflow that endeavors to correct inconsistencies through a set of rules, heuristics or other conflict resolution policies. Process 300 may, in addition or in lieu of automatic remediation, be configured to generate an alarm or some other notification regarding any unresolved discrepancies. The notification may be transmitted to an administrator or other data center personnel, enabling the recipient to manually verify the data, perform further analysis, take corrective action, and the like.

Figure 3:
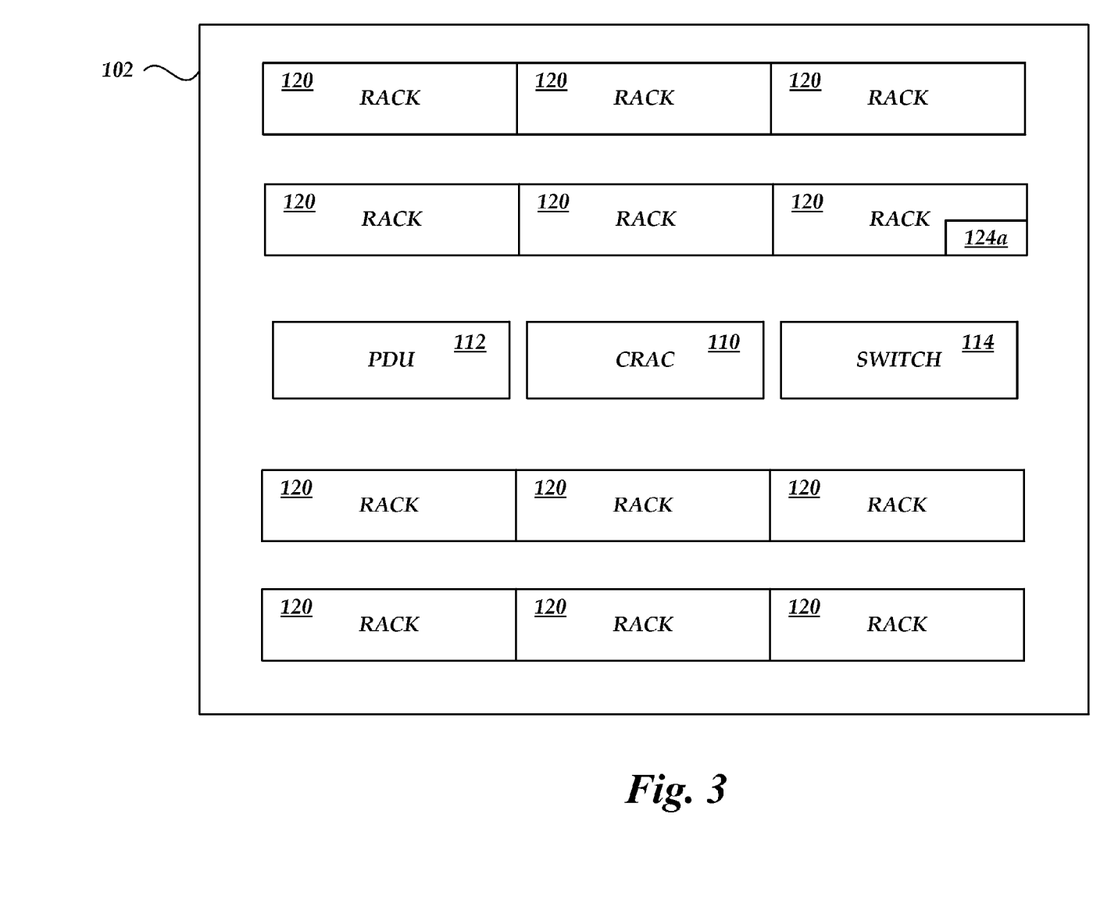
FIG. 3 is a block diagram of an illustrative data center room and various components that may be included therein.

At block 206, a physical map may be generated based on physical location data obtained in block 204. For example, an architectural blueprint or engineering plans may provide the basis for a map of the physical location of data center components. Scanned barcode data, manually entered data, and other data may then be compiled and used to specify where in the data center 100 each physical component is located. FIG. 3 illustrates an example layout of a data center room 102. The room 102 includes a number of racks 120 aligned in rows. The racks 120 can contain power, networking, and computing equipment, such as a server 124a. Additionally, the room 102 illustrated in FIG. 3 includes room-level power components such as a PDU 112, a cooling system such as a CRAC 110, and room-level networking components such as a switch 114.

The computing system executing the process 200 can assemble a physical map of a data center room 102, such as the example map illustrated in FIG. 3, by associating each component with its corresponding physical location on the room map. The associations may be determined by referring to the data records obtained in block 204, described above. For example, barcode scanning records can be loaded and analyzed, and each data center component can be associated with a location on the map according to the unique identifier of the location with which the component is associated in a barcode scanning record. In similar fashion, a blueprint or plan for a rack 120 may be provided, and each server 124 or other data center component contained in the rack 120 may be associated with its corresponding physical location within the rack 120 by referring to the data records obtained in block 204. The barcode scanning record for the individual server 124a illustrated in FIG. 3 may include data regarding the physical location of the server 124a, such as the rack 120 in which the server 124a is mounted, and the server's 124a position within the rack 120. The barcode scanning record for the rack 120 may include data regarding the physical location of the rack 120, such as the room 102 in which the rack is located and the rack's 120 position within the room 102, and so on. As a result, a physical map, such as the example map illustrated in FIG. 3, may be generated.

Figure 4:
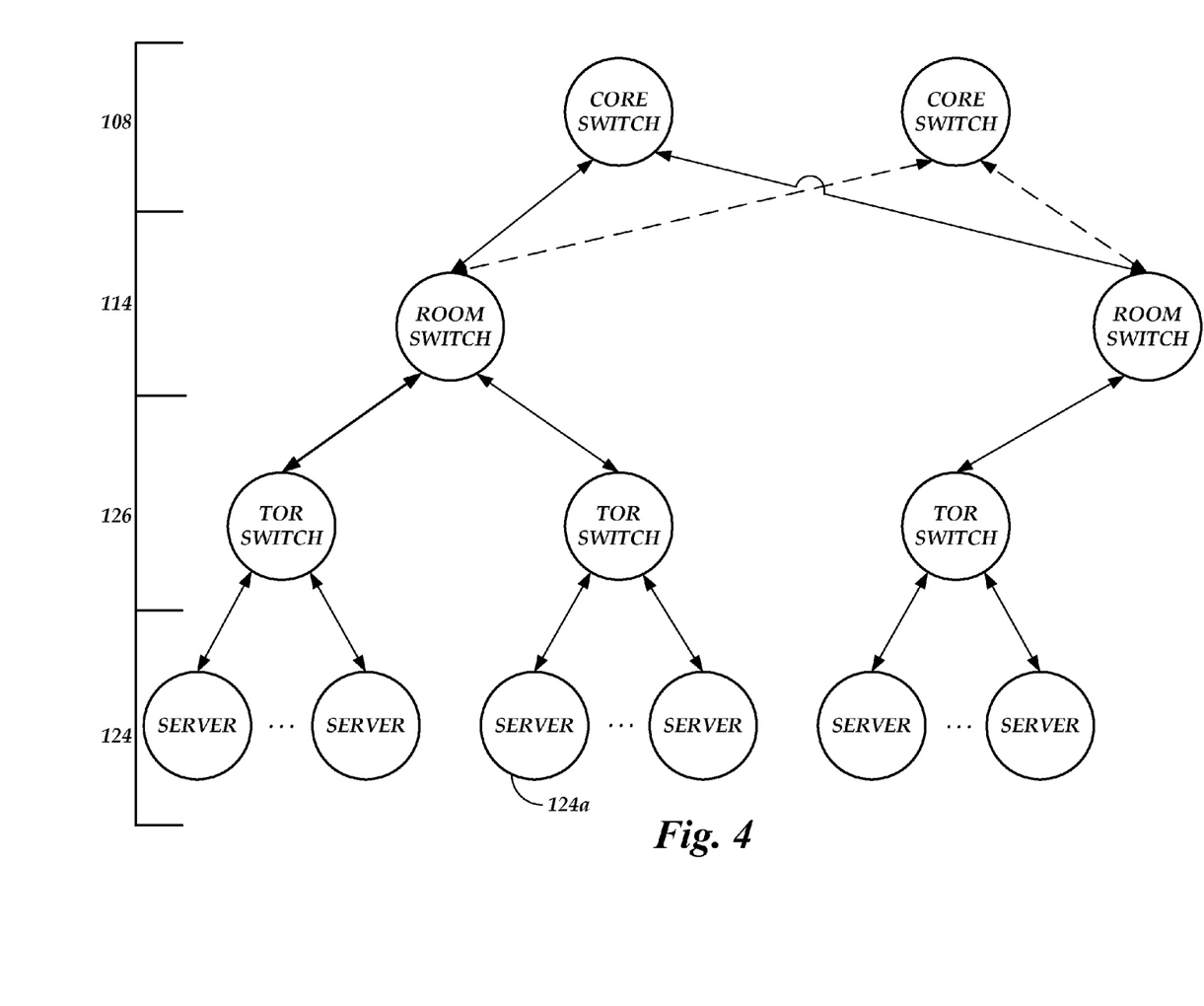
FIG. 4 is a graph illustrative of network connections between various data center components.

At block 208, a network map may be generated based on connection data obtained in block 204. For example, a computer data structure, such as a directed graph, may be used to both illustrate and store information about the connections between data center components. FIG. 4 illustrates one example graph of network connectivity between computing devices of the data center 100. The leaves of the graph represent the servers 124 of the data center 100, such as the server 124a illustrated in FIG. 3 as being physically located within a specific rack 120 and room 102 within the data center 100. The various parent nodes of the graph illustrated in FIG. 4 represent the networking components 126 at the rack level which provide network connectivity to the servers 124, networking components 114 at the room level which provide network connectivity to the racks 120, and networking components 108 at the data center level which provide network connectivity to the rooms 102 and to one or more networks outside of the data center 100. Each room-level switch 114 may redundantly connect to a number of core stitches 108 to enhance fault tolerance, provide load balancing, etc. Although not illustrated in FIG. 4, there may also be redundant network components at the room level 114 and at the rack level 126. In some embodiments, barcode data associated with each component may be loaded and analyzed by the computing system executing the process 200 in order to generate connectivity graphs such as the sample illustrated in FIG. 4.

The graph illustrated in FIG. 4 may be used to determine which network components 126, 114, 108 are used when specific servers 124 communicate with each other. For example, two servers 124 located on the same rack may communicate with each other through a single rack-level switch 126, thereby reducing latency. A fault or other error condition associated with the specific rack-level switch 126, however, will interrupt network connectivity for both servers 124. In another example, communications between two servers 124 located in different rooms of the data center may pass through two or more rack-level switches 126, two or more room-level switches 114, and a core switch 108. Latency for such communications will be higher than the latency associated with communications of the previous example (e.g.: two servers 124 physically located on the same rack 120). A fault or other error condition associated with a single rack-level or room-level networking component 114, 126 will not interrupt network connectivity for both servers 124, however, because communications to and from each of the servers 124 travels though different rack-level and room-level networking components 114, 126. One skilled in the art will appreciate that alternative network topologies of varying complexity may be implemented and represented in graph form; the graph of FIG. 4 is illustrative only. Additionally, the power system 106 and cooling system 104 of the data center 100 may be represented with a directed graph such as the graph of FIG. 4. For example, data-center-level power system 106 components may provide power to multiple room-level PDUs 112 which in turn provide power to rack-level PDUs 122 and so on. One skilled in the art will appreciate that "containment" hierarchies may also be represented logically as connected graphs like FIG. 4, where parent nodes "contain" child nodes, so connectivity and containment may in some embodiments be represented and analyzed using similar data representations and software.

At block 210, the computing system executing the process 200 may obtain additional information about the operating environment of each data center component. The additional information may be variable over time, especially in comparison to the physical location of the data center components, and therefore may be monitored by sensors and the like. For example, the temperature of various data center components and of the rooms 102 in which the components are located can vary over time, often from one minute to the next, depending upon factors such as the workloads of the computing devices, the efficiency of the cooling system, and anomalous events like fires, floods and device blowouts (e.g., UPS explosion). Temperature data may be manually input into a computing system for use in the process 200, for example by technicians surveying areas of the data center room 102 with thermometers. In order to capture minute-to-minute temperature measurements, however, some automated system for tracking temperature may be implemented. In some embodiments, temperature sensors, such as thermistors, may be affixed to or integrated with various data center components to provide a temperature reading for the immediate area of the component. Sensors may also be placed at various locations within a data center room 102 to provide data regarding ambient room 102 temperature. Data from the various sensors may be transmitted to a server or other device where the data is stored as a data record including the temperature reading of the sensor and the unique identifier for the component or location associated with the sensor. In some embodiments, other variable information may be tracked, such as power consumption, network traffic, and the like.

Figure 5:
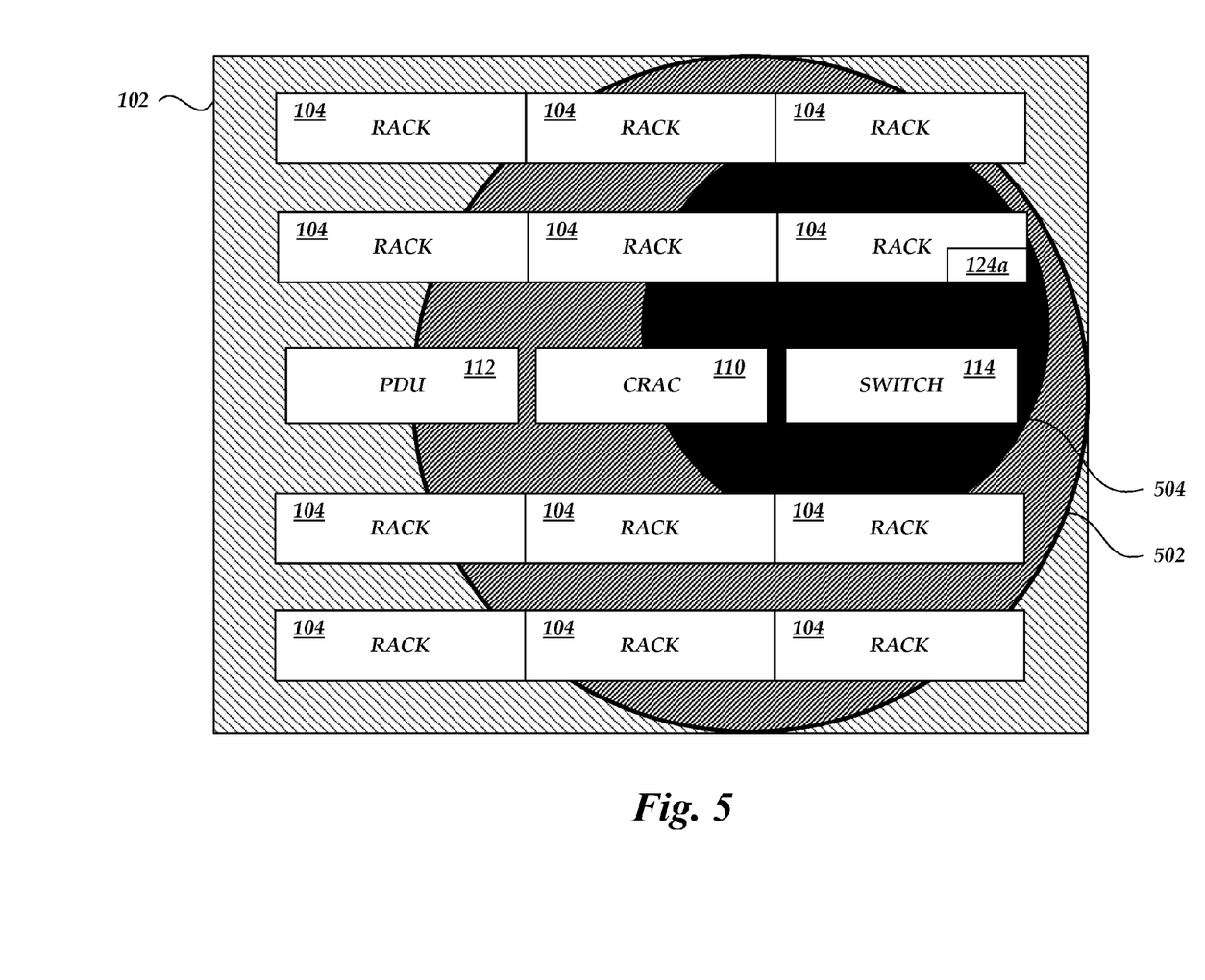
FIG. 5 is a block diagram of an illustrative data center room and various temperature zones that may be detected therein.

At block 212, a map may be generated to summarize or graphically display information about the data obtained in block 210. FIG. 5 illustrates an example map of temperature zones within a data center room 102. The map of FIG. 5 is based on the physical map illustrated in FIG. 3, with the addition of shaded regions 502, 504 indicating temperature variations within the room 102. Data from which the shaded regions 502, 504 are defined may be obtained as described above with respect to block 210. The shaded regions 502, 504 may indicate different temperature ranges, such as a temperature range of 100-120 degrees for region 504, a temperature of 80-100 degrees for region 502, and the shading of the rest of the room 102 indicating a temperature of under 80 degrees. It will be appreciated that different temperature ranges may be used, such as more fine-grained temperature ranges of 10 degrees, 5 degrees, or less. In some embodiments, rather than using discrete shading to indicate temperature ranges, the map may instead use a continuous range of shading or colors to indicate discrete temperatures, such as might be seen on a heat map.

Maps generated from environmental or operational data, such as the map illustrated in FIG. 5, may be used to graphically present information data center characteristics other than temperature. For example, as described above, a computing system executing the process 200 may obtain information regarding power consumption, network traffic, computing activity, and the like. Similar to the temperature map described above, areas of higher power consumption, traffic, or activity may be shaded differently than areas of lower power consumption, traffic, or activity.

At decision block 214, the computing device executing the process 200 determines whether to continue monitoring the variable characteristics at block 210 or to end the process 200. Due to the variable nature of the data obtained in block 210 and processed during the map generation operations of block 212, the two blocks may repeat continuously or for a set amount of time in order to provide updated information. For example, an administrator or technician may wish to view or otherwise access the information in substantially real-time. In such a case, the process 200 may return to block 210 until the process 200 is stopped by the administrator other otherwise terminated. In some cases, the process 200 is executed one time only, and execution does not return to block 210. For example, a schedule may be implemented to obtain updated information, including the linked graphs, on an hourly basis, nightly basis, or on some other periodic or irregular schedule. The operations of blocks 210 and 212 will execute one time only in such cases, and the process will then terminate.

Figure 6:
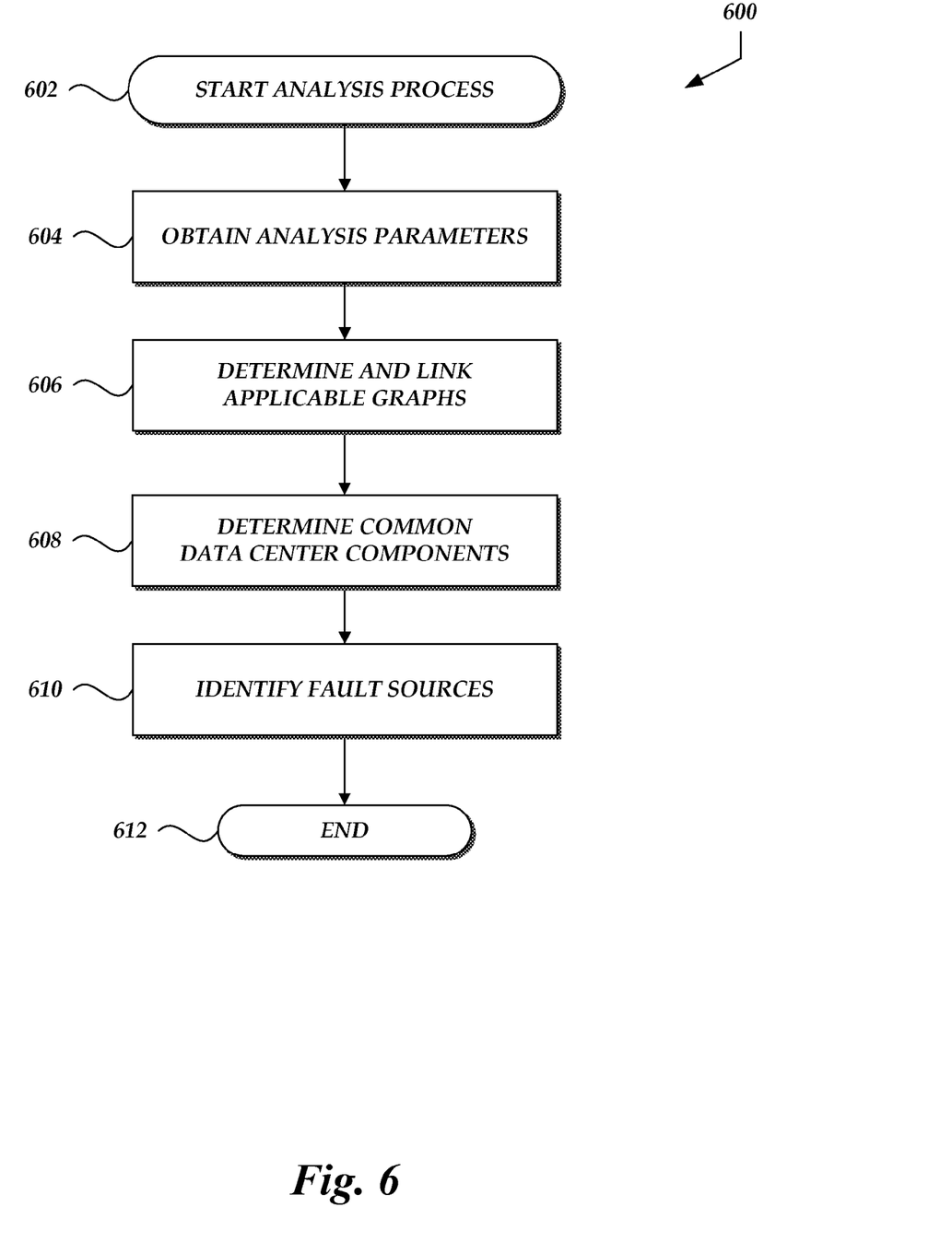
FIG. 6 is a flow diagram of an illustrative process for querying various physical and logical maps of data center components.

Turning now to the flow diagram illustrated in FIG. 6, a sample process 600 for analyzing the maps and graphs generated by the process 200 of FIG. 2 will be described. The maps and graphs can each present a different dimension of overall data center 100 topology. By linking and overlaying the maps, administrators and other interested parties may analyze physical, environment, and operational characteristics of the data center 100 in multiple dimensions to determine potential problem areas, troubleshoot existing problems, make placement decisions about customer VMs in order to improve fault tolerance and performance, and so on. For example, a thermal map, such as the map illustrated in FIG. 5, may be used to determine if a CRAC 110 is malfunctioning. By linking the thermal map to a power system connection graph, technicians can determine which power system components combine to provide power to the malfunctioning CRAC 110 so that the various power linkages and PDUs can be checked. Further combining the thermal map with a customer VM graph, such as the graph illustrated in FIG. 7, administrators can determine which customer VMs may be affected by the high temperatures caused by the malfunctioning CRAC 110.

In another example, if a user, such as a technician or administrator, wishes to obtain a listing of all components shared in some way by two servers 124, the user may enter the unique identifiers for the servers 124. Connectivity graphs, such as a network graph and a power graph, may then be linked by the nodes corresponding to the servers 124, and the graphs may be traversed to determine which components of the various systems are shared by the servers 124. When shared components are identified, a physical location graph may be linked to determine the physical location of the shared components and their proximity to the servers 124. Such information may be useful in determining which types of faults will affect both servers 124. The complex connectivity and large number of interdependent systems and components in a large scale data center 100 may hide serious potential issues, such as a single fault condition disabling two critical components of different systems located in different rooms 102. The linkage of maps and graphs described below can aid in the identification and prevention of such issues.

The process 600 begins at block 602. The process 600 may be initiated on-demand, for example by an administrator or technician executing a computer program on a computing system located within or remote from the data center 100. For example, the process 600 may be embodied in a set of executable program instructions and stored on a computer-readable medium drive associated with the computing system. When the process 600 is initiated, the executable program instructions can be loaded into memory, such as RAM, and executed by one or more processors of computing system. In some embodiments, the computing system may include multiple computing devices, such as servers, and the process 600 may be executed by multiple servers, serially or in parallel.

At block 604, a computing system executing the process 600 can obtain analysis parameters for the current execution of the process 600. For example, a particular customer may have a redundant system with one server 124a in the role of master, and a second server 124b in the role of slave. Data resides in volatile RAM memory on the master 124a for up to 30 minutes before being saved to non-volatile storage such as a hard disk. The data in RAM is therefore duplicated in RAM of the slave 124b so that if a fault condition occurs that affects the master 124a, such as a loss of power or network connectivity in the rack 120 or the room 102 in which the master 124a is physically located, only the master 124a will be affected and the slave 124b can take over and perform any required functions without a loss of data. A user, such as a technician or administrator, may provide the computing system executing the process 500 with the unique identifiers of the master 124a and slave 124b in order to obtain information about shared components. The information may be used to ensure that the system can indeed survive a single fault without a loss of data, as described above. The subsequent blocks of the process 600 will be described with respect to the current example of the master 124a and slave 124b. It will be appreciated, however, that the process 600 can apply to any data center components and may be used to analyze the map and graph data differently, as described above.

Figure 7:
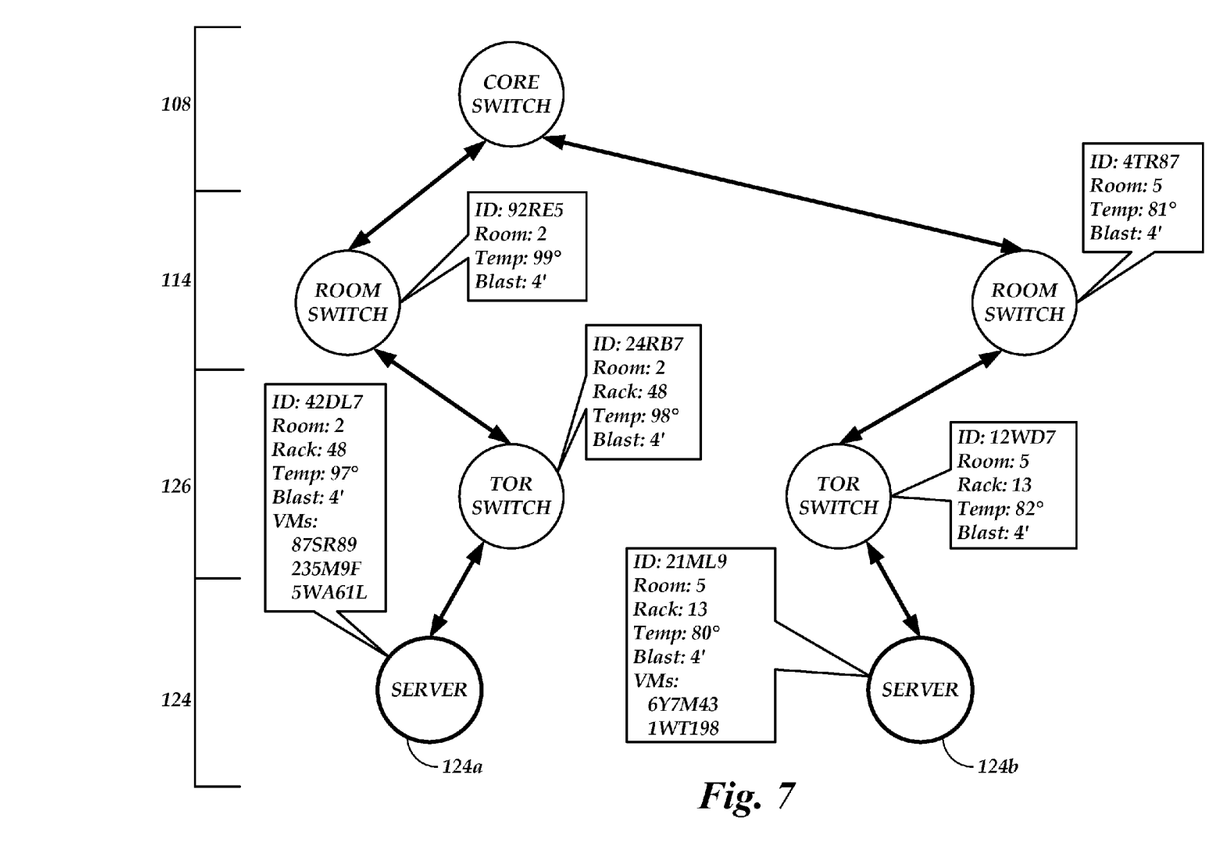
FIG. 7 is a graph illustrative of network connections between various data center components.

At block 606, the computing system executing the process 600 can determine the applicable topology maps to link in order to return the desired results. In the current example, the unique identifiers of the master 124a and slave 124b servers in question have been obtained. The computing system executing the process 600 may start with a network connectivity graph, such as the graph illustrated in FIG. 7. The network graph of FIG. 7 illustrates the network components utilized in communications involving the master 124a and slave 124b. Illustrative, information about each component is shown, including location information and other characteristics associated with the component. In some embodiments, the graphs and maps do not contain such information. In such cases, the computing system executing the process 600 can query a database which stores data records associated with each component for the information shown in FIG. 7.

Figure 8:
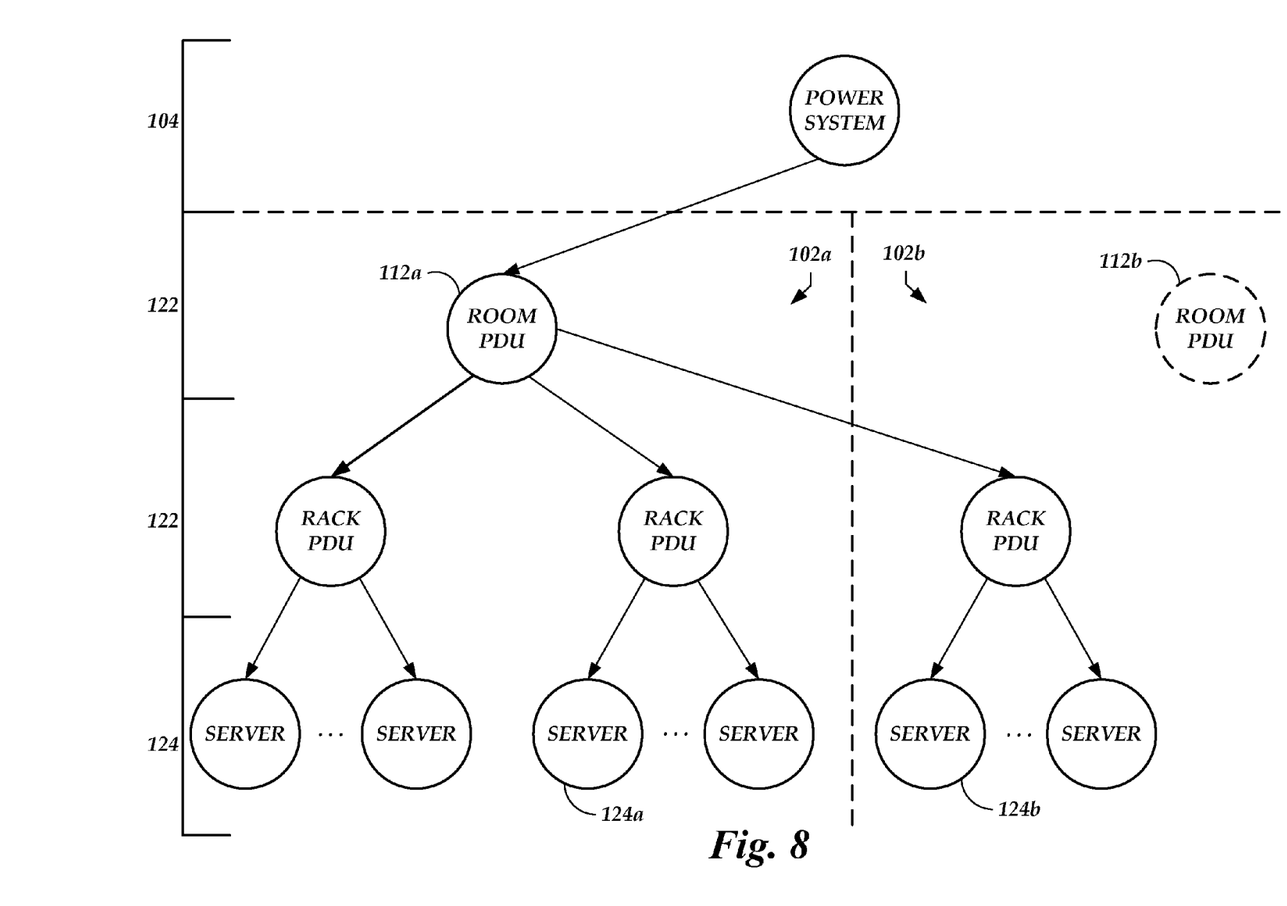
FIG. 8 is a graph illustrative of power system connections between various data center components.

Linking the maps and graphs can involve identifying a component or multiple components common to each map to be linked. The common components may then be identified in each map or graph, thereby allowing the information from one map to be analyzed for a possible affect on components in another map. In the current example, the master 124a and slave 124b may be used. A physical map of the rooms 102 can be linked so that room 102 and rack 120 locations of the master 124a and slave 124b can be identified, and nearby components which may affect one or the other may be determined. In addition to the physical map, other connectivity maps may be linked, such as a connectivity map of the power system 106 as illustrated in FIG. 8.

At block 608, the computing system executing the process 600 can analyze the linked topology maps and traverse the linked connection graphs to detect components common to both the master 124a and slave 124b. As shown in the network connectivity graph of FIG. 7, the master 124a and slave 124b only share one networking component: the core switch at the data center network level 108. In practice, each component of the data center 100 which has network connectivity may share at least one common component at the data center level due to the limited number of network links between the data center 100 and the network outside of the data center, such as the Internet.

Due to the physical location of the master 124a and slave 124b in different rooms, the physical maps of the rooms 102 may not indicate any additional common components. A traversal of the power system graph of FIG. 8, however, indicates that the master 124a and slave 124b share a common room-level PDU 112a, even though the master 124a and slave 124b are in separate rooms 102a, 102b.

At block 610, the computing system executing the process 200 can identify which of the common components may cause a fault in both the master 124a and the slave 124b. As described above, any two servers 124 in the data center 100 may ultimately have a network component in common such as a core switch, a power component in common such as the primary power source, and so on. If the core network components 108 of data center or the primary power system components 106 failed, the master 124a and slave 124b would be affected. However, most or all of the rest of the servers 124 and other components of the data center 100 would also be affected. The operations of block 610 identify fault sources which may affect a smaller number of components—such as the two servers of the current example, the master 124a and slave 124b.

In the present example, the common room level PDU 112a may be identified as potentially affecting both the master 124a and the slave 124b if it were to shut down or otherwise experience an interruption in operation. The purpose of associating the slave 124b with the master 124a is for redundancy and fault tolerance in case of fault conditions which affect the operation of the master 124a. The slave 124b was chosen from a different room 102 of the data center 100, thereby decreasing the number of components which, upon failure, would affect both servers 124a, 124b. However, because the room level PDU 112a located in the data center room 102 with the master 124a has also been employed to provide power to the data center room 102 in which the slave 124b is located, a fault affecting the PDU 112a may also affect both master 124a and slave 124b. Such a design anomaly may occur, for example, if the room level PDU 112b associated with the room 102 in which the slave 124b is physically located failed, and power was routed into the room 102 from a PDU 112a located in another room 102 of the data center 100. Without the network graph, physical map, and connection graph described above, and the linkages between them, such a deployment anomaly may not have been uncovered or been reasonably discoverable until an event interrupting the operation of both the master 124a and the slave 124b occurred.

Depending on the embodiment, certain acts, events, or functions of any of the processes or algorithms described herein can be performed in a different sequence, can be added, merged, or left out all together (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented in application-specific hardware, or in software executed by hardware, depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for analyzing data center components, the system comprising:
   one or more processors;
   a computer-readable memory; and
   a module comprising executable instructions stored in the computer-readable memory, the module, when executed by the one or more processors, configured to:
   retrieve, from a data store, a plurality of data records regarding physical and operational characteristics of a plurality of computing devices;
   generate a first graph representing a relationship among a first set of computing devices, the relationship based at least partly on a physical or operational characteristic of each of the first set of computing devices;
   generate a second graph representing a relationship among a second set of computing devices, the relationship based at least partly on a physical or operational characteristic of each of the second set of computing devices;
   link the first graph and the second graph based at least partly on a presence, in each of first set of computing devices and the second set of computing devices, of a common computing device; and
   in response to a query regarding a queried computing device, identify a third set of computing devices related to the queried computing devices based at least partly on the relationship represented by the first graph and the relationship represented by the second graph.

2. The system of claim 1, wherein the plurality of computing devices comprises at least one of a server computing device or a network component.

3. The system of claim 1, wherein the physical and operational characteristics comprise at least one of physical location, network connection, power source connection, temperature, physical blast radius, or logical blast radius.

4. The system of claim 1, wherein the common computing device is the queried computing device.

5. The system of claim 1, wherein at least one of the first graph and the second graph comprises a directed graph.

6. A computer-implemented method for analyzing data center components, the computer-implemented method comprising:
- obtaining, by a data center analysis system comprising one or more computing devices, a plurality of data records regarding characteristics of a plurality of data center components;
- generating, by the data center analysis system, a first graph representing a relationship among a first set of data center components of the plurality of data center components, the relationship based at least partly on a first characteristic of each of the first set of data center components;
- generating, by the data center analysis system, a second graph representing a relationship among a second set of data center components of the plurality of data center components, the relationship based at least partly on a second characteristic of each of the second set of data center components; and
- linking, by the data center analysis system, the first graph and the second graph based at least partly on a presence, in each of first set of data center components and the second set of data center components, of a common data center component.

7. The computer-implemented method of claim 6, wherein the plurality of data center components comprises at least one of a server computing device, a power distribution unit, a network component, or a virtual machine instance.

8. The computer-implemented method of claim 6, wherein the characteristics comprise at least one of physical location, network connection, power source connection, temperature, physical blast radius, or logical blast radius.

9. The computer-implemented method of claim 6, wherein the plurality of data records comprise a unique identifier and a physical location for each data center component of the plurality of data center components.

10. The computer-implemented method of claim 6, wherein data regarding at least one of the characteristics of the plurality of data center components is received from one or more sensors.

11. The computer-implemented method of claim 10, wherein one or more of the plurality of data center components comprises an integrated sensor.

12. The computer-implemented method of claim 6, wherein at least one of the first graph and second graph comprises a directed graph.

13. The computer-implemented method of claim 6 further comprising:
- receiving, from a user of the data center analysis system, a query regarding two or more queried data center components; and
- in response to the query, identifying a third set of data center components of the plurality of data center components, each data center component of the third set of data center components related to the two or more queried data center components based at least partly on the relationship represented by the first graph and the relationship represented by the second graph.

14. The computer-implemented method of claim 13, wherein the module is further configured to, in response to the query, return to the user data regarding characteristics of the third set of data center components.

15. The computer-implemented method of claim 6 further comprising:
- receiving, from a user of the data center analysis system, a query regarding two or more virtual machines associated with a customer; and
- in response to the query, identifying a third set of data center components of the plurality of data center components, wherein a failure of a data component of the third set of data components would affect the two or more virtual machines associated with the customer.

16. The computer-implemented method of claim 15, wherein the module is further configured to, in response to the query, return to the user data regarding characteristics of the third set of data center components.

17. The computer-implemented method of claim 6 further comprising:
- generating, by the data center analysis system, a third graph representing a relationship among a third set of data center components of the plurality of data center components, the relationship based at least partly on a third characteristic of each of the third set of data center components; and
- linking, by the data center analysis system, the second graph and the third graph based at least partly on a presence, in each of second set of data center components and the third set of data center components, of a second common data center component.

18. The computer-implemented method of claim 6, further comprising:
- detecting a discrepancy in the plurality of data records, wherein the discrepancy comprises two more or mutually exclusive values associated with a characteristic of a data center component; and
- generating a notification regarding the discrepancy.

19. A system for analyzing data center components, the system comprising:
- one or more processors;
- a computer-readable memory; and
- a module comprising executable instructions stored in the computer-readable memory, the module, when executed by the one or more processors, configured to:
  - generate a first graph representing a relationship among a first set of data center components, the relationship based at least partly on a characteristic of each of the first set of data center components;
  - generate a second graph representing a relationship among a second set of data center components, the relationship based at least partly on a characteristic of each of the second set of data center components; and
  - link the first graph and the second graph based at least partly on a presence, in each of first set of data center components and the second set of data center components, of a common data center component.

20. The system of claim 19, wherein the first set of data center components and the second set of data center components comprises at least one of a server computing device, a power distribution unit, a network component, or a virtual machine instance.

21. The system of claim 19, wherein the characteristic of each of the first set of data center components or the characteristic of each of the second set of data center components comprises one of physical location, network connection, power source connection, temperature, physical blast radius, or logical blast radius.

22. The system of claim 19, wherein data regarding at least one of the characteristics of the first set of data center components or the second set of data center components is received from one or more sensors.

23. The system of claim 19, wherein the link between the first graph and the second graph is further based at least partly on a presence in each of the first graph and the second graph of a common characteristic.

24. The system of claim 19, wherein the module is further configured to update the first graph and the second graph on a schedule.

25. The system of claim 19, wherein the module is further configured to update the first graph and the second graph in substantially real time.

26. The system of claim 19, wherein the module is further configured to:
   receive a query regarding a queried data center component; and
   in response to the query, identify a third set of data center components related to the queried data center component based at least partly on the relationship represented by the first graph and the relationship represented by the second graph.

27. The system of claim 26, wherein the common data center component comprises the queried data center component.

28. The system of claim 19, wherein the module is further configured to:
   receive a query regarding two or more queried data center components; and
   in response to the query, identify a third set of data center components related to the two or more queried data center components based at least partly on the relationship represented by the first graph and the relationship represented by the second graph.

29. The system of claim 28, wherein the common data center component comprises one of the two or more queried data center components.

30. The system of claim 19, wherein the module is further configured to:
   generate a third graph representing a relationship among a third set of data center components, the relationship based at least partly on a characteristic of each of the third set of data center components; and
   link the second graph and the third graph based at least partly on a presence, in each of second set of data center components and the third set of data center components, of a second common data center component.

* * * * *